(12) United States Patent
Sturkovich et al.

(10) Patent No.: US 9,225,500 B2
(45) Date of Patent: Dec. 29, 2015

(54) MICROWAVE BACKHAUL SYSTEM HAVING A DUAL CHANNEL OVER A SINGLE INTERCONNECT

(75) Inventors: Kobi Sturkovich, Netanya (IL); Igal Kushnir, Azur (IL)

(73) Assignee: Broadcom Corporation, Irvine, CA (US)

( * ) Notice: Subject to any disclaimer, the term of this patent is extended or adjusted under 35 U.S.C. 154(b) by 244 days.

(21) Appl. No.: 13/615,913

(22) Filed: Sep. 14, 2012

(65) Prior Publication Data

US 2013/0135986 A1     May 30, 2013

Related U.S. Application Data

(60) Provisional application No. 61/565,469, filed on Nov. 30, 2011.

(51) Int. Cl.
| | | |
|---|---|---|
| *H04L 5/14* | (2006.01) | |
| *H04L 27/02* | (2006.01) | |
| *H04L 27/36* | (2006.01) | |

(52) U.S. Cl.
CPC ............ *H04L 5/143* (2013.01); *H04L 5/1461* (2013.01); *H04L 27/02* (2013.01); *H04L 27/368* (2013.01)

(58) Field of Classification Search
None
See application file for complete search history.

(56) References Cited

U.S. PATENT DOCUMENTS

| | | |
|---|---|---|
| 5,548,807 A | 8/1996 | Ueda |
| 5,640,691 A | 6/1997 | Davis et al. |
| 5,987,060 A | 11/1999 | Grenon et al. |
| 6,144,165 A | 11/2000 | Liedenbaum |
| 6,731,946 B1 | 5/2004 | Stanwood et al. |

(Continued)

FOREIGN PATENT DOCUMENTS

| | | |
|---|---|---|
| CN | 1735999 A | 2/2006 |
| CN | 101317332 A | 12/2008 |

(Continued)

OTHER PUBLICATIONS

Office Action directed to related Taiwanese Patent Application No. 101133671, mailed Jul. 17, 2014; 6 pages.

(Continued)

*Primary Examiner* — Chirag Shah
*Assistant Examiner* — Suk Jin Kang
(74) *Attorney, Agent, or Firm* — Sterne, Kessler, Goldstein & Fox P.L.L.C.

(57) ABSTRACT

A microwave backhaul architecture having a dual channel over a single interconnect is provided. The backhaul architecture includes an indoor communication unit and an outdoor communication unit (ODU), which may include an N-Plexer configured to perform decouple one or more transmitted signals from one or more received signals. The ODU also includes an RF module, an analog-to-digital/digital-to-analog converter (ADC/DAC) and a digital signal processor (DSP) configured to process received data in the digital domain such that errors may be detected and/or corrected. Further, the backhaul architecture is configured to allow two transmission channels and two receipt channels to coexist on the single interconnect. The single interconnect may be implemented such that the two transmission and receipt Channels may support communication at a highest possible baud rate. Thus, the single interconnect allows for data to be communicated to the ODU over two communication channels, without having to add an additional interconnect.

19 Claims, 8 Drawing Sheets

(56) References Cited

U.S. PATENT DOCUMENTS

| | | | |
|---|---|---|---|
| 6,782,211 | B1 | 8/2004 | Core |
| 7,643,512 | B2 | 1/2010 | Gorsetman et al. |
| 7,839,842 | B2 | 11/2010 | Zhang et al. |
| 7,856,048 | B1 | 12/2010 | Smaini et al. |
| 8,018,375 | B1 | 9/2011 | Alexopoulos et al. |
| 8,095,088 | B2 | 1/2012 | Shen et al. |
| 8,488,970 | B2* | 7/2013 | Huang et al. ............... 398/115 |
| 2003/0043077 | A1 | 3/2003 | Alexopoulos et al. |
| 2003/0137329 | A1* | 7/2003 | Van Der Valk et al. ....... 327/156 |
| 2003/0152140 | A1 | 8/2003 | Antoniak |
| 2003/0156668 | A1 | 8/2003 | Atkinson et al. |
| 2004/0106380 | A1 | 6/2004 | Vassiliou et al. |
| 2004/0203528 | A1* | 10/2004 | Ammar et al. ............... 455/90.3 |
| 2005/0124307 | A1* | 6/2005 | Ammar et al. ............. 455/183.2 |
| 2006/0098614 | A1* | 5/2006 | Moon et al. ................... 370/338 |
| 2007/0069901 | A1 | 3/2007 | Tuck et al. |
| 2007/0129031 | A1 | 6/2007 | Newton et al. |
| 2008/0002581 | A1* | 1/2008 | Gorsetman et al. ........... 370/232 |
| 2008/0014866 | A1 | 1/2008 | Lipowski et al. |
| 2008/0287076 | A1 | 11/2008 | Shen et al. |
| 2009/0115757 | A1 | 5/2009 | Bae |
| 2009/0124213 | A1 | 5/2009 | Rubin et al. |
| 2009/0152445 | A1 | 6/2009 | Gardner |
| 2009/0168864 | A1 | 7/2009 | Teramoto |
| 2009/0232257 | A1* | 9/2009 | Bury ............................ 375/341 |
| 2010/0067476 | A1 | 3/2010 | Periyalwar et al. |
| 2010/0272163 | A1* | 10/2010 | Prager et al. ................. 375/220 |
| 2011/0051654 | A1 | 3/2011 | Blankenship et al. |
| 2011/0080985 | A1 | 4/2011 | Secker et al. |
| 2011/0286552 | A1* | 11/2011 | Briand ......................... 375/316 |
| 2012/0083304 | A1* | 4/2012 | Yang et al. ................... 455/507 |
| 2012/0093100 | A1* | 4/2012 | Qin et al. ..................... 370/329 |
| 2012/0195392 | A1* | 8/2012 | Kushnir et al. ............... 375/296 |
| 2012/0220246 | A1* | 8/2012 | Kushnir et al. ............... 455/118 |
| 2012/0307695 | A1 | 12/2012 | Yehezkely et al. |
| 2013/0094554 | A1* | 4/2013 | Kennard ...................... 375/222 |
| 2013/0113650 | A1 | 5/2013 | Behbahani et al. |
| 2013/0128936 | A1* | 5/2013 | Kennard et al. .............. 375/222 |
| 2013/0135985 | A1 | 5/2013 | Friedmann et al. |
| 2013/0136039 | A1 | 5/2013 | Sturkovich et al. |
| 2013/0136163 | A1 | 5/2013 | Friedmann et al. |
| 2013/0137381 | A1 | 5/2013 | Vassiliou et al. |
| 2013/0178177 | A1* | 7/2013 | Kushnir et al. ............... 455/118 |

FOREIGN PATENT DOCUMENTS

| | | |
|---|---|---|
| CN | 101465705 A | 6/2009 |
| CN | 101771441 A | 7/2010 |
| CN | 102255119 A | 11/2011 |
| EP | 1298848 A2 | 4/2003 |
| EP | 1 962 431 A1 | 8/2008 |
| EP | 2 299 775 A1 | 3/2011 |
| JP | 4462043 B2 | 2/2010 |
| JP | 2011/199880 A | 10/2011 |
| TW | I335156 B | 12/2010 |
| WO | WO 2004/064197 A1 | 7/2004 |
| WO | WO 2011/032790 A1 | 3/2011 |

OTHER PUBLICATIONS

Office Action directed to related Chinese Patent Application No. 201210372182.6, mailed Jul. 2, 2014: 7 pages.
CPRI Specification V5.0—Common Public Radio Interface (CPRI); Interface Specification, Ericsson AB, Huawei Technologies Co. Ltd, NEC Corporation, Alcatel Lucent and Nokia Siemens Networks GmbH & Co. KG, pp. 1-119, Sep. 21, 2011.
IEEE Standard for Information Technology—Telecommunications and Information Exchange Between Systems—Local and Metropolitan Area Networks—Specific Requirements, Version 802.3-2008 (Revision of 802.3-2005), Part 3: Carrier Sense Multiple Access with Collision Detection (CSMA/CD) Access Method and Physical Layer Specifications, Section 4, pp. 1-586, IEEE, Piscataway NJ, 2008.
Kuwano, S. et al., "Digitized Radio-over-Fiber (DROF) System for Wide-Area Ubiquitous Wireless Network," MWP '06: International Topical Meeting on Microwave Photonics, 4 pages, 2006.
Partial Search Report for European Application No. EP 12 00 6163, European Patent Office, Munich, Germany, 9 pages, mailed on Apr. 3, 2013.
Office Action for related Taiwanese Patent Application No. I 01133022, mailed Mar. 24, 2014; 8 pages.
Office action directed to related Korean Patent Application No. 10-2012-0103653, mailed Apr. 22, 2014; 8 pages.
English-language Abstract of Japanese Patent No. 4462043 B2; 1 page.
Communication from the Examining Division of the European Patent Office, directed to related European Patent Application No. 12 006 163.5, mailed Mar. 11, 2014; 9 pages.
Office Action directed to related Taiwanese Patent Application No. 101140962, mailed Mar. 24, 2014; 8 pages.
Office Action directed to related Chinese Patent Application No. 201210501036.9, mailed Sep. 24, 2014; 6 pages.
"Fixed Radio Systems; Point-to-Point Equipment; Presenting Important Aspects of the Spatial Frequency Reuse Method; DTR/TM-4153", European Telecommunications Standards Institute, Nov. 23, 2006, Valbonne, France; pp. 1-35.
European Search Report directed to related European Patent Application No. 13005543.7, mailed Mar. 4, 2014; 9 pages.
English-Language Abstract for Chinese Patent Publication No. CN 101771441 A, published Jul. 7, 2010; 2 pages.
Office Action directed to related Chinese Patent Application No. 201210372182.6, mailed on Feb. 2, 2015; 8 pages.

* cited by examiner

MICROWAVE BACKHAUL SYSTEM HAVING A DUAL CHANNEL OVER A SINGLE INTERCONNECT

CROSS REFERENCE TO RELATED APPLICATIONS

This application claims the benefit of U.S. Provisional Patent Application No. 61/565,469, filed Nov. 30, 2011, which is incorporated herein by reference in its entirety.

BACKGROUND OF THE INVENTION

1. Field of the Invention

The invention generally relates to microwave backhaul architecture, and more specifically to a microwave backhaul architecture supporting a dual channel communication pathway.

2. Related Art

Conventional microwave backhaul architectures are generally implemented as either a split outdoor unit (split ODU) configuration or an all outdoor unit (all ODU) configuration. Conventional split ODU configurations are generally comprised of both an indoor unit (IDU) and an outdoor unit (ODU), where the IDU and the ODU are connected over a single channel coaxial interconnect. The IDU in a conventional split ODU configuration typically includes a modem, a digital-to-analog converter and a baseband-to-intermediate frequency converter. Under normal operation, these conventional split ODU configurations generally involve transmitting an analog signal, at an intermediate frequency, over the single channel coaxial interconnect between the IDU and the ODU. However, during this transmission, the analog signal can be subjected to various errors, which can result from deficiencies associated with the IDU. Additionally, the lack of digital capabilities of these conventional ODUs generally render them ineffective in terms of correcting the errors within the analog signal.

Moreover, the typical single channel coaxial interconnect used to transmit the analog signal between the IDU and ODU has a number of limitations itself. For example, the coaxial interconnect can be relatively expensive to implement, can have a limited bandwidth, and can experience signal loses under certain conditions. Further, as the demand for higher capacity mobile backhaul networks continues to increase, the limitations associated with these conventional coaxial interconnects will only become more problematic.

In particular, mobile backhaul providers are experiencing a growing demand for increased capacity as well as a shift from voice services to data services. These factors are driving mobile backhaul networks towards high capacity IP/Ethernet connections. Additionally, the transition to 4G and LTE networks is also driving the need for higher capacity, and moving more packet traffic onto mobile backhaul networks. As a result, the limitations of conventional single channel coaxial interconnects make it increasingly difficult to meet these increasing user demands.

In some instances, all ODU configurations have been used as an alternative to these conventional split ODU configurations. Conventional all ODU configurations include only an ODU, and thus do not include an IDU. The ODU therefore includes a modem, a digital-to-analog converter as well as a baseband-to-radio frequency converter. Implementing all of these functional components in the ODU typically provides some digital capabilities within the ODU, and also typically allows for the implementation of digital connectivity within these conventional all ODU configurations. This is in contrast to the typical ODU utilized in the conventional split ODU configuration, which generally lacks digital capabilities, and generally utilizes analog connectivity. However, the conventional all ODU configurations also have limitations. For example, conventional all ODU configurations are typically still only implemented having a single channel interconnect between the IDU and the ODU, which again limits the capacity of the mobile backhaul network. Further, including all of the aforementioned functionality within the ODU increases installation and repair costs, can result in inefficient power consumption, and can decrease an overall reliability of these conventional all ODU configurations.

Thus, neither conventional split ODU configurations nor all ODU configurations effectively meet the increasing demands for capacity.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
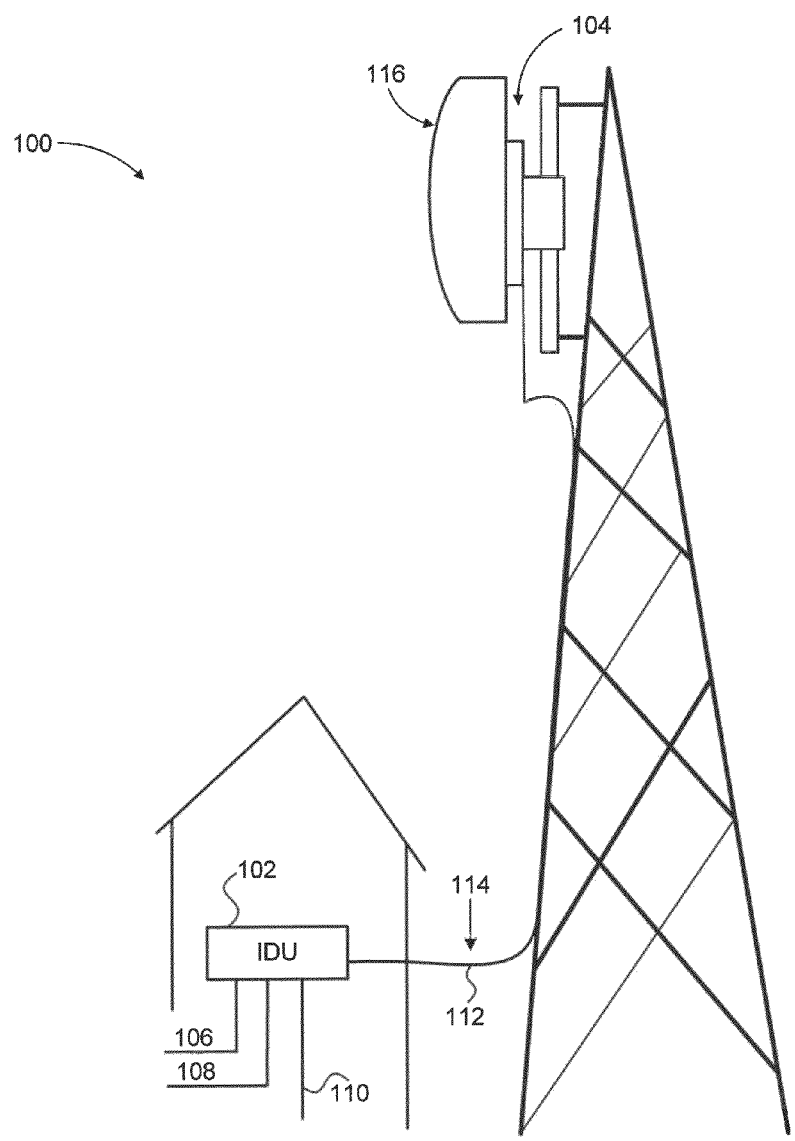
FIG. 1 illustrates a block diagram of a first microwave backhaul system according to an exemplary embodiment of the present invention.

Embodiments of the invention will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

The following Detailed. Description refers to accompanying drawings to illustrate exemplary embodiments consistent with the invention. References in the Detailed Description to "one exemplary embodiment," "an exemplary embodiment,"

"an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

An Exemplary Microwave Backhaul System

FIG. 1 illustrates a block diagram of a first microwave backhaul system 100 that includes an indoor communication unit (IDU) 102 and an outdoor communication unit (ODU) 104 according to an exemplary embodiment of the present invention. Microwave, as used throughout this disclosure, refers to both terrestrial point-to-point (PtP) radio communications, as well as point-to-multipoint communications, and can include both wired and/or wireless communications.

Microwave backhaul system 100 initiates communication by accessing an information source, which can comprise, for example, audio data 106, video data 108, or any other data capable of being transmitted over an Internet Protocol (IP)/Ethernet connection 110. To facilitate this communication, IDU 102 is coupled to a core network. In particular, IDU 102 is configured to acquire one or more sequences of digital data (e.g., audio data 106, video data 108, data transmitted over IP/Ethernet connection 110, or the like) from the core network. IDU 102 can also be configured to support several additional services, such as Ethernet, time-division multiplexing (TDM), and control data that is aggregated over a radio link.

IDU 102 can be implemented at a location that is substantially removed from ODU 104, such as at a location at ground level. For example, IDU 102 can be positioned inside of a home or an office building, or the like. Conversely, ODU 104 can be implemented at a substantially elevated location, such as on top of a pole, on top of an antenna tower, on top of a building, or the like. In some embodiments, IDU 102 and ODU 104 can be separated by a distance up to approximately 300 meters; however other distances are possible.

IDU 102 and ODU 104 are connected via a communication pathway 112, which is configured such that data 114 can be transmitted between IDU 102 and ODU 104. Communication pathway 112 can comprise an Ethernet cable, a fiber optic cable, a coaxial cable, an intermediate frequency (IF) cable, a twisted pair cable, a shielded cable, a category 5 cable, a category 6 cable, or one or more copper wires. Therefore, depending on a chosen communication medium, communication pathway 112 can facilitate transmission of an analog signal or a digital signal between IDU 102 and ODU 104. In some embodiments, communication pathway 112 can be a wireless communication channel. Additionally, an antenna 116 can be coupled to ODU 104, and can be positioned close to ODU 104. Therefore, microwave backhaul system 100 is implemented such that data 114 can be transmitted from IDU 102, across communication pathway 112, to ODU 104, and subsequently to antenna 116 where communication over a wireless link can then be initiated. Also, microwave backhaul system 100 is implemented such that data 114 received by antenna 116 can be transmitted from ODU 104 over communication pathway 112 to IDU 102.

As will be discussed in greater detail below, ODU 104 can be a "smart ODU." For example, ODU 104 can have digital capabilities, which can be implemented to improve the radio frequency (RF) functionalities within ODU 104. However, ODU 104 may not include all of the functionalities of a modem, which can instead be completely implemented within IDU 102 or split between the IDU 102 and ODU 104 Therefore, when ODU 104 is implemented as a "smart ODU," microwave backhaul system 100 can provide more efficient communication between IDU 102 and ODU 104. The limitations generally associated with the transmission of data in conventional split ODU configurations are eliminated because of the digital capabilities, and the corresponding improved RF functionalities, of ODU 104. For example, ODU 104 can sample data 114 received from IDU 102 and then correct the detected errors (e.g. by removing noise from data 114), which can be associated with either the IDU 102 or the communication pathway 112. ODU 104 can then process data 114 such that it can be properly transmitted over a wireless link via antenna 116.

As will also be discuss in greater detail below, communication pathway 112 can be a dual channel pathway. For example, communication pathway 112 can be implemented such that two transmission channels and two receipt channels can each coexist over communication pathway 112 at any given time. Additionally, in some embodiments, the two transmission channels and the two receipt channels, which may comprise communication pathway 112, may facilitate communication of data 114 at a highest possible baud rate. Therefore, communication pathway 112, including the two transmission channels and the two receipt channels, may eliminate the need to add a second communication pathway between IDU 102 and ODU 104. In particular, in conventional microwave backhaul systems two communication pathways were needed to support two transmission channels and two receipt channels; however, this need for two communication pathways is eliminated by communication pathway 112's ability to support two transmission channels and two receipt channels at any given time. Further, by extending coaxial cable frequency support, many imperfections can be disabled during this dual channel mode of operation. Therefore, microwave backhaul system 100 can be configured such that these imperfections are removed, and such that the dual channel mode of operation is supported.

In an embodiment, ODU 104 can also correct errors associated with a signal received over a wireless link via antenna 116. Microwave backhaul system 100 can also be configured to support adaptive coding and modulation (ACM), which provides high reliability of microwave backhaul system 100 even in extreme weather, such as wind, rain, hail, or the like.

IDU 102 includes a modem assembly, while ODU 104 includes at least some RF functionalities as well as corresponding digital capabilities.

Although the description of the present invention is to be described in terms of microwave backhaul architecture, those skilled in the relevant art(s) will recognize that the present invention can be applicable to other architectures without departing from the spirit and scope of the present invention.

Figure 2A:
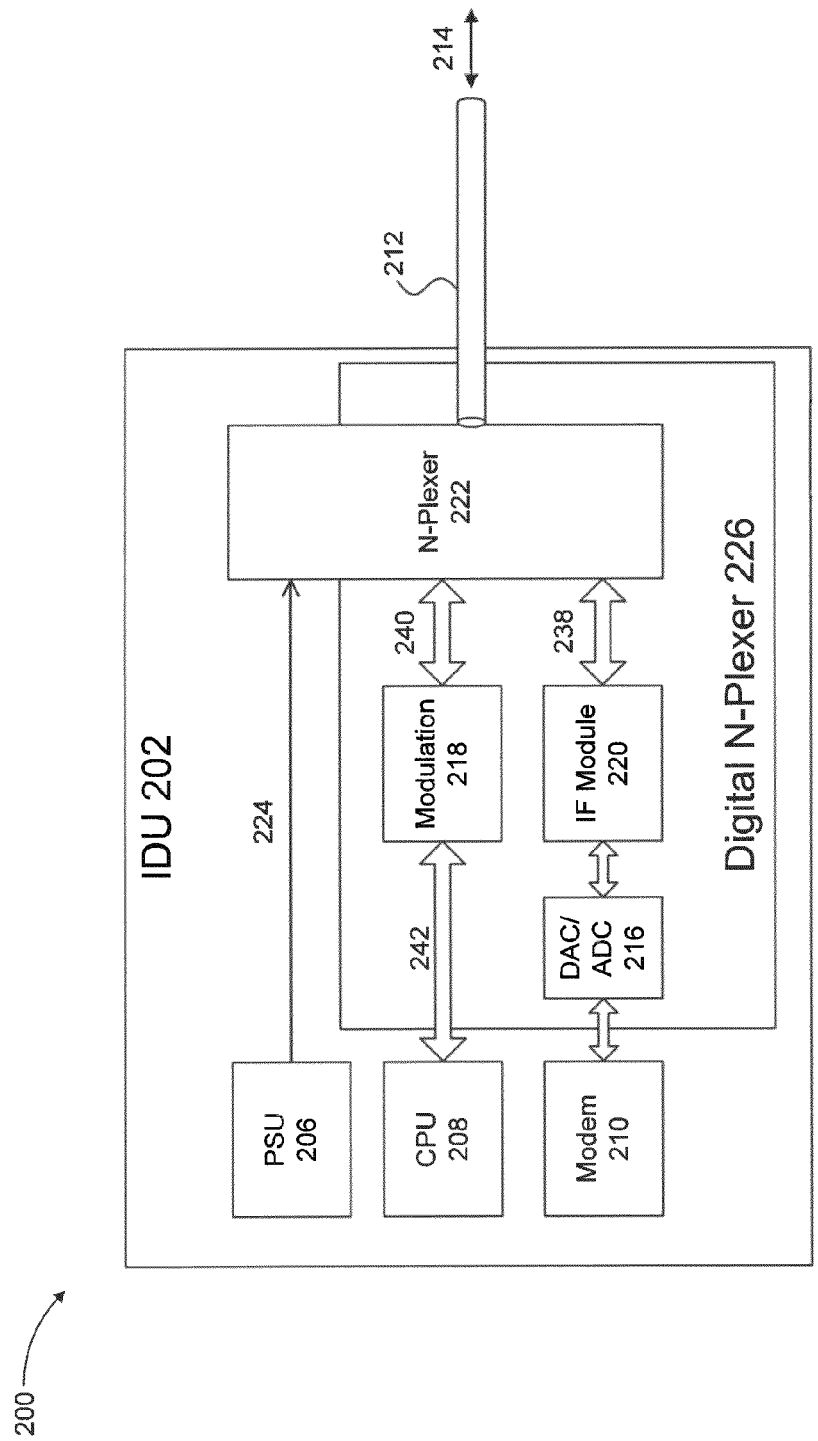
FIG. 2A illustrates a block diagram of an indoor communication unit (IDU) for implementation within a microwave backhaul system according to an exemplary embodiment of the present invention.
Figure 2B:
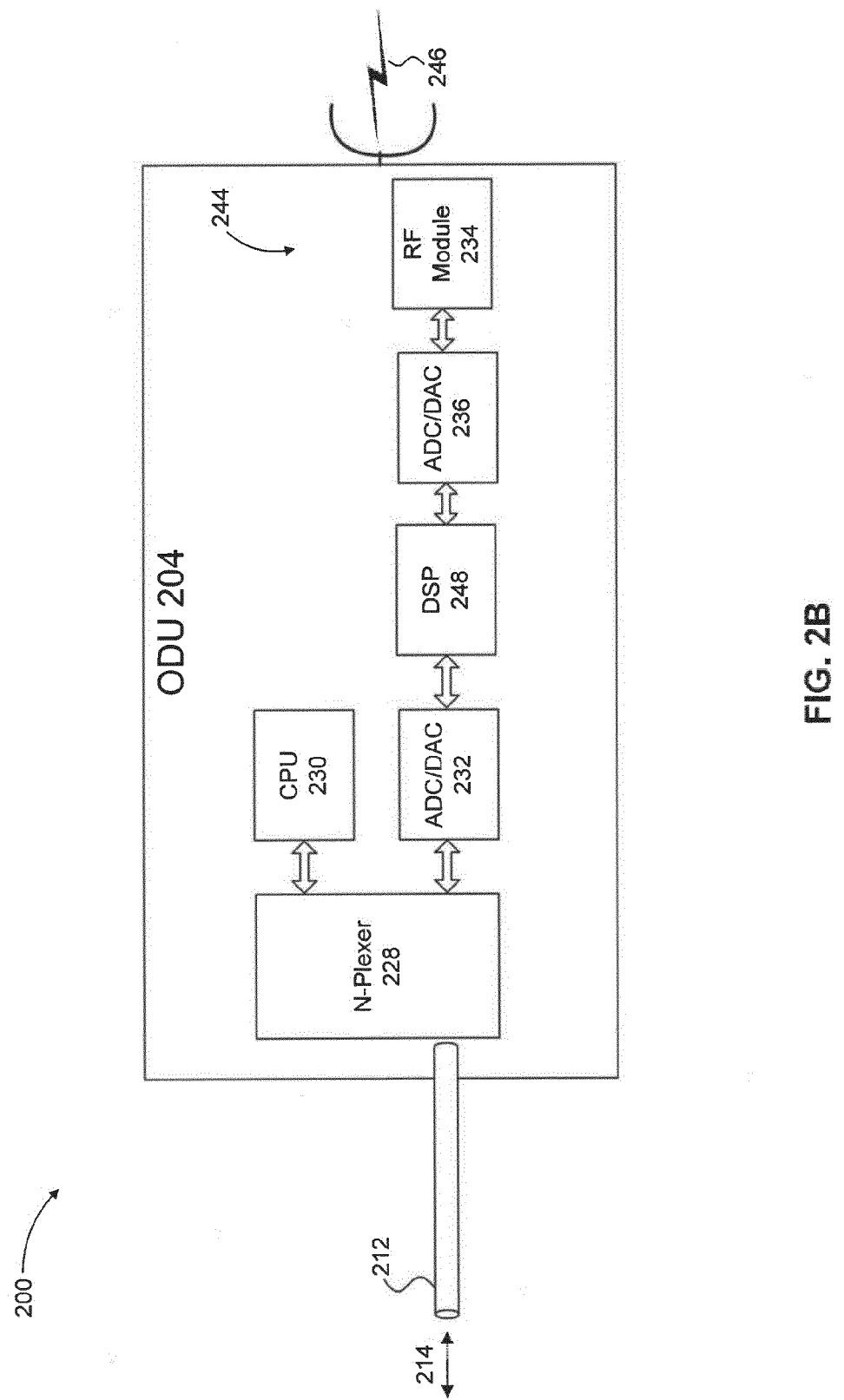
FIG. 2B illustrates a block diagram of a first outdoor communication unit (ODU) for implementation within a microwave backhaul system according to an exemplary embodiment of the present invention.

An Exemplary Indoor Communication Unit (IDU) and Outdoor Communication Unit (ODU) Configuration FIGS. 2A and 2B illustrate block diagrams of an indoor communication unit (IDU) 202 and a first outdoor communication unit (ODU) 204, respectively, for use within a microwave backhaul system 200 according to an exemplary embodiment of the present invention. IDU 202 and ODU 204 are coupled together via a communication pathway 212. IDU 202 can represent an exemplary embodiment of IDU 102 of FIG. 1, and ODU 204 can represent an exemplary embodiment of ODU 104 of FIG. 1.

IDU 202 includes a power supply unit (PSU) 206, a CPU 208, a modem assembly 210, a digital-to-analog converter/analog-to-digital converter (DAC/ADC) block 216, a modulation block 218, and an intermediate frequency (IF) module 220. In some embodiments, IDU 202 can also include an N-Plexer 222.

As illustrated in FIG. 2A, PSU 206 is configured to produce a DC output voltage 224. CPU 208 is configured to carry out instructions to perform arithmetical, logical, and/or input/output (I/O) operations of one or more of the aforementioned elements contained within IDU 202. In an embodiment, CPU 208 can control operation of modulation block 218 and N-Plexer 222.

Modem assembly 210 is configured to perform modulation and demodulation of data 214 that is to be transmitted between IDU 202 and ODU 204. In some embodiments, modem assembly 210 can function substantially similar to a baseband modem. Further, modem assembly 210 can be configured to cancel out noise associated with IDU 202 or communication pathway 212.

DAC/ADC block 216 can be configured to transmit and/or receive data from modem assembly 210. DAC/ADC block 216 is also configured to perform digital-to-analog and/or analog-to-digital conversions of data 214 such that data 214 is suitable for transmission over communication pathway 212.

Modulation block 218 can be configured to transmit and/or receive a signal 242 from CPU 208. Modulation block 218 can also be configured to perform various modulation and/or demodulation techniques. In an embodiment, modulation block 218 can be configured to perform amplitude-shift keying. For example, modulation block 218 can be configured to perform amplitude-shift keying by utilizing a finite number of amplitudes, where each amplitude is assigned a unique pattern of binary digits. Each pattern can then be configured to form the specific symbol that is represented by the particular amplitude. Additionally, when modulation block 218 is configured to perform demodulation, modulation block 218 determines the amplitude of the received signal and maps it back to the symbol it represents, thus recovering the original data.

IF module 220 can be configured to transmit and/or receive data from DAC/ADC block 216. IF module 220 is also configured to perform a frequency conversion of the received data such that data 214 is suitable for transmission over communication pathway 212. For example, IF module 220 can be configured to convert data 214 from a baseband frequency to an IF.

N-Plexer 222 can be configured to permit N-directional communication over communication pathway 212. In particular, N-Plexer 222 is configured to isolate IDU 202 from ODU 204, while permitting them to share a common antenna. N-Plexer 222 is also configured to receive DC output voltage 224 from PSU 206, to receive a control signal 240 (e.g. a Telemetry ASK signal) output from modulation block 218, and to receive an IF signal 238 output from IF module 220. Additionally, N-Plexer 222 can be configured to convert and/or combine each of these inputs to form data 214. N-Plexer 222 is also configured to transmit and/or receive data 214, over communication pathway 212, between IDU 202 and ODU 204. In an embodiment, N-Plexer 222 can function substantially as an analog duplexer (multiplexer/demultiplexer).

In embodiments, communication pathway 212 can include one or more links (e.g. pathways). Communication pathway 212 can be configured to permit transmission of approximately four different signals between IDU 202 and ODU 204; however, transmissions of more or less signals are possible between IDU 202 and ODU 204. For example, communication pathway 212 can be configured to transmit a transmission communication signal (TX), a receipt communication signal (RX), an up control signal, and a down control signal. Additionally, or alternatively, communication pathway 212 can be configured to allow TX, RX, a Telemetry ASK signal (output from modulation block 218) and DC output voltage 224 to coexist on communication pathway 212. In an embodiment, communication pathway 212 can represent an IF cable, and thus the conversion to the analog domain of these signals can be performed at IDU 202 (e.g. by DAC/ADC block 216).

Further, communication pathway 212 can be a dual channel communication pathway, which can effectively double the capacity of microwave backhaul system 200. In some embodiments, the dual channel communication pathway can include a transmit pathway and a receive pathway, such that a portion of the bandwidth of the dual channel communication pathway is allocated into the transmit pathway to facilitate communication from IDU 202 to ODU 204, and a remaining portion of the bandwidth is allocated into the receive pathway to facilitate communication from the ODU 204 to the IDU 202. Additionally, dual channel communication pathway can include two bi-directional pathways, such that a first bi-directional pathway facilitates communication between a first IDU and a first ODU, and the second bi-directional pathway facilitates communication between a second IDU and a second ODU (see FIG. 5). Further, dual channel communication pathway can include two bi-directional pathways that each facilitate communication between the same two IDUs (or the same two ODUs) and the same single ODU (or the same single IDU). For example, each bi-directional pathway can handle a portion of the overall bandwidth between the two IDUs and the single ODU, thereby effectively doubling the capacity of microwave backhaul system. Additional characteristics of dual channel communication pathways will be discussed in detail below with references to FIGS. 5 and 6.

In an exemplary embodiment, DAC/ADC block 216, modulation block 218, IF module 220 and N-Plexer 222 can be replaced by Digital N-Plexer 226. In particular, Digital N-Plexer 226 can be configured to multiplex/demultiplex the required signal in the digital domain, rather than in the analog domain. Subsequently, Digital N-Plexer 226 can allow communication pathway 212 to be implemented as either a digital pathway or an analog pathway. Using Digital N-Plexer 226 allows for a simpler implementation of IDU 202. For example, when implementing IDU 202 having Digital N-Plexer 226, no analog functionality would be required, and instead only a single digital chip substrate would be needed. As a result, the cost of implementing IDU 202 can be decreased. Additionally, using a Digital N-Plexer 226 can provide an improved yield, shorter production testing, lower assembly cost, lower peripheral component count, and can support greater distances between IDU 202 and ODU 204, to provide some examples.

As illustrated in FIG. 2B, ODU 204 can also include an N-Plexer 228, which can be implemented in several different manners. For example, N-Plexer 228 can be an analog N-Plexer, a digital N-Plexer, or a split function N-Plexer (e.g., where N-Plexer 228 is partially analog and partially digital). When N-Plexer 228 represents a digital N-Plexer, N-Plexer 228 can function in a substantially similar manner as Digital N-Plexer 226. In particular, N-Plexer 228 can be configured to multiplex/demultiplex signals in the digital domain. N-Plexer 228 also allows for a simpler implementation of ODU 204 because no analog functionality would be required, and instead only a single digital chip substrate would need to be implemented within ODU 204. Therefore, the cost of implementing ODU 204 can also be decreased. Similar to Digital N-Plexer 226, implementing N-Plexer 228 within ODU 204 can provide an improved yield, shorter production testing, lower assembly cost, lower peripheral component count, and can support greater distances between IDU 202 and ODU 204, to provide some examples.

In an embodiment, IDU 202 and ODU 204 can be configured to perform an N-Plexer elimination technique. In particular, the functionality directed towards filtering RX, after being received over communication pathway 212, and TX, before being transmitted over communication pathway 212, can be removed from N-Plexers 226 and 228. Instead, this functionality can be implemented within the digital chip substrate (e.g. integrated circuit) that comprises IDU 202 and the digital chip substrate (e.g. integrated circuit) that comprises ODU 204. IDU 202 and ODU 204 can then filter the required signals through any combination of an analog filtering process, a signal sampling process and/or a digital filtering process.

ODU 204 can also include a CPU 230, ADC/DAC blocks 232 and 236, a digital signal processor (DSP) 248, and an RF module 234. CPU 230 can be configured to function in a substantially similar manner as CPU 208. In particular, CPU 230 is configured to carry out instructions to perform arithmetical, logical, and/or I/O operations of one or more of the elements contained within ODU 204. In an embodiment, CPU 208 can control operation of N-Plexer 228. ADC/DAC block 232 can be configured to transmit and/or receive data from N-Plexer 228. ADC/DAC blocks 232 and 236 are also configured to perform analog-to-digital and/or digital-to-analog conversions of data 214 such that data 214 can be properly transmitted and/or received over communication pathway 212. Further, DSP 248 can be configured to preform mathematical manipulation techniques on data 214, such that data 214 may be modified or improved according to a desired processing method. For example, DSP 248 can be configured to measure, filter, or compress data 214 prior to being output to ADC/DAC block 236, such that error detection and/or error correction can be performed on data 214. In an embodiment, after data 214 is received, over communication pathway 212, at ODU 204, data 214 traverses through N-Plexer 228, to ADC/DAC block 232, to DSP 248, to ADC/DAC block 236, to RF module 234 and to an antenna 244 before being transmitted across wireless link 246. Similarly, after data 214 is received, over wireless link 246, at ODU 204, data 214 traverses from antenna 244 to RF module 234, to ADC/DAC block 236, to DSP 248, to ADC/DAC block 232, and to N-Plexer 228 before being transmitted over communication pathway 212.

RF module 234 can be configured to transmit and/or receive data from ADC/DAC block 236. RF module 234 is also configured to perform a frequency conversion of data 214 such that data 214 can be properly received over communication pathway 212. For example, when data 214 is received at RF module 234, data 214 can have a frequency residing in the IF range. Therefore, RF module 234 can up-convert data 214 from an IF to a RF such that data 214 can then be transmitted over wireless link 246. RF module 234 can also be configured to down-convert a signal received over the wireless link from a RF to an IF such that the received signal can be transmitted over communication pathway 212 to IDU 202.

An Exemplary Outdoor Communication Unit (ODU)

Figure 3:
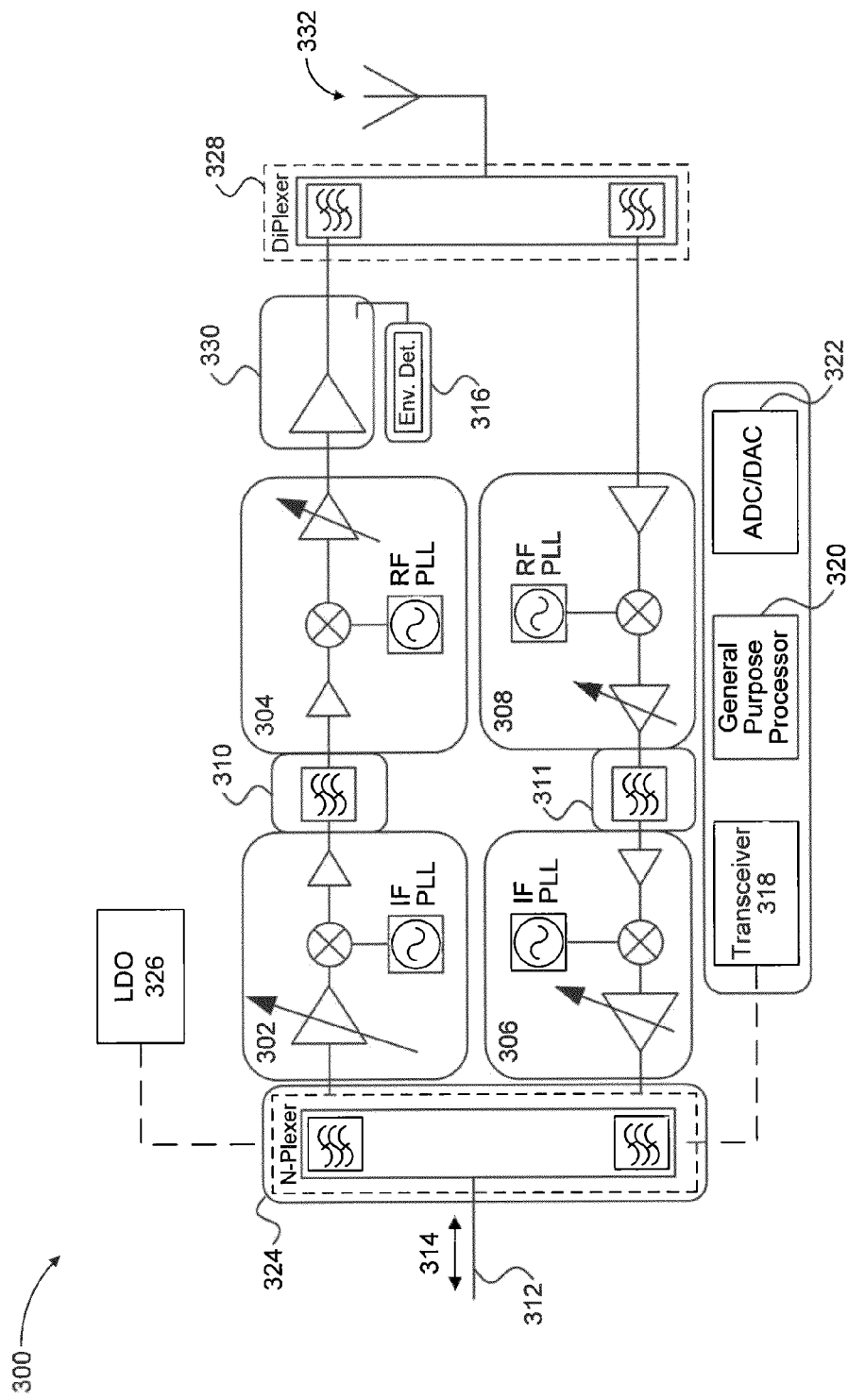
FIG. 3 illustrates a block diagram of a second outdoor communication unit (ODU) for implementation within a microwave backhaul system according to an exemplary embodiment of the present invention.

FIG. 3 illustrates a block diagram of a second outdoor communication unit (ODU) 300 according to an exemplary embodiment of the present invention. ODU 300 can represent an exemplary embodiment of ODU 204. ODU 300 includes multiple frequency converters 302, 304, 306 and 308, a power amplifier 330, an envelope detector 316, a transceiver module 318, a general purpose processor 320, a general purpose analog-to-digital converter (ADC) 322, an N-Plexer 324, a low dropout regulator (LDO) 326, and a diplexer 328. In some embodiments, ODU 300 can also include filters 310 and 311.

Frequency converters 302 and 304 can function substantially as frequency up-converters. In particular, when data 314 is received over communication pathway 312, the data can have a frequency in the IF range. Therefore, frequency converters 302 and 304 can up-convert data 314 from IF to RF such that it can be transmitted over a wireless communication link via antenna 332.

Frequency converters 306 and 308 can function substantially as frequency down-converters. In particular, when a signal is received at antenna 332, over the wireless link, the data can have a frequency in the RF range. Therefore, frequency converters 302 and 304 can down-convert the received signal from RF to IF such that it can be transmitted over communication pathway 312.

In an exemplary embodiment, frequency converters 302-308 may be replaced by a single PLL, which may be configured to perform both the necessary up-conversion as well as the necessary down-conversions discussed above.

Each frequency converter 302-308 can include a phased locked loop (PLL). For example, frequency converters 302 and 306 can each include an IF PLL, and frequency converters 304 and 308 can each include an RF PLL. The PLLs can be implemented as electronic circuits, each consisting of a variable frequency oscillator and a phase detector. These electronic circuits can be configured to compare a phase of an input signal (e.g. data 314 or the received signal from antenna 332) with a phase of a signal derived from its output oscillator and adjust a frequency of its oscillator to keep these phases matched. A signal, representing a different between the phase of the input signal and the phase of the signal derived from the output oscillator, from the phase detector can also be used to control the oscillator via a feedback loop.

Frequency converters 302 and 304, as well as frequency converters 306 and 308, can have a filter 310 and 311 implemented therebetween respectively. As discussed above, filters 310 and 311 can be configured to filter data 314 such that data 314 can be transmitted and/or received over communication pathway 312. For example, filters 310 and 311 can be configured to perform any combination of an analog filtering process, a signal sampling process and/or a digital filtering process.

Power amplifier 330 can be configured to amplify data 314, after data 314 has been up-converted by frequency converters 302 and 304. In particular, power amplifier 330 is configured to amplify data 314 such that it is capable of being transmitted over the wireless link via antenna 332. Power amplifier 330 can be coupled to envelope detector 316, which can be configured to reduce ODU 300's power consumption. For example, envelope detector 316 can be configured to receive a high-frequency input and provide an output that represents the envelope of the original input.

Transceiver module 318 is configured to control communication between ODU 300 and a corresponding IDU. In particular, transceiver module 318 can control the operation of ODU 300 by sending command controls to the aforementioned functional elements included within ODU 300. Transceiver module 318 may perform at least some of the functionality performed by modulation block 218 located within IDU 202. For example, transceiver module 318 can be configured to perform amplitude-shift keying when data 314 is transmitted and/or received over communication pathway 312. Transceiver module 318 is coupled to general purpose processor 320 and ADC/DAC 322, as well as N-Plexer 324. General purpose processor 320 and general purpose ADC 322 can function substantially similar to CPU 230 and ADC/DAC block 232, respectively.

LDO 326 is coupled to N-Plexer 324 and is configured to regulate DC linear output voltage (e.g. DC output voltage 224 received from IDU 202). LDO 326 can also be configured to operate at a relatively low minimum operating voltage, to operate at a relatively high efficiency and to produce a relatively low heat dissipation.

Diplexer 328 is configured to permit bi-directional communication over the wireless link. In particular, diplexer 328 is configured to isolate frequency converters 302 and 304 from frequency converters 306 and 308, while permitting them to share a common antenna 332. In particular, diplexer 328 is configured to receive data 314 from power amplifier 330, and to output data 314 to antenna 332 such that it can be transmitted over the wireless link. Additionally, or alternatively, diplexer 328 is configured to receive a signal from antenna 332, and to output the signal to frequency converters 308 and 306.

Frequency converters 302, 304, 306 and 308, filters 310 and 311, power amplifier 330, envelope detector 316, transceiver module 318, general purpose processor 320 and general purpose ADC 322 can be implemented on a single digital chip substrate (e.g. an integrated circuit), while LDO 326, diplexer 328 and at least a portion of N-Plexer 324 may be implemented on another chip substrate. When ODU 300 is implemented having each of these elements on a single digital chip substrate, ODU 300 has substantial digital capabilities, thus allowing ODU 300 to perform multiple digital processing techniques. These digital capabilities and digital processing techniques will be discussed in greater detail below.

In some embodiments, N-Plexer 324 can function substantially similar to N-Plexer 228. In particular, N-Plexer 324 can be configured to multiplex/demultiplex the required signal in the digital domain. Therefore, N-Plexer 324 can also allow for a simpler implementation of ODU 300 because no analog functionality would be required. Instead, only a single digital chip substrate would need to be implemented within ODU 300. Therefore, the cost of implementing ODU 300 can also be decreased.

Frequency converters 302, 304, 306 and 308, power amplifier 330, filters 310 and 311, envelope detector 316, transceiver module 318, general purpose processor 320, general purpose ADC 322, N-Plexer 324, LDO 326, and diplexer 328 are provided for illustrative purposes only, and is not meant to limit the disclosure in any way. Those skilled in the relevant art(s) will recognize that different combinations and/or orientations of these elements, as well as additional elements, are possible without departing from the spirit and scope of the present disclosure.

Figure 4:
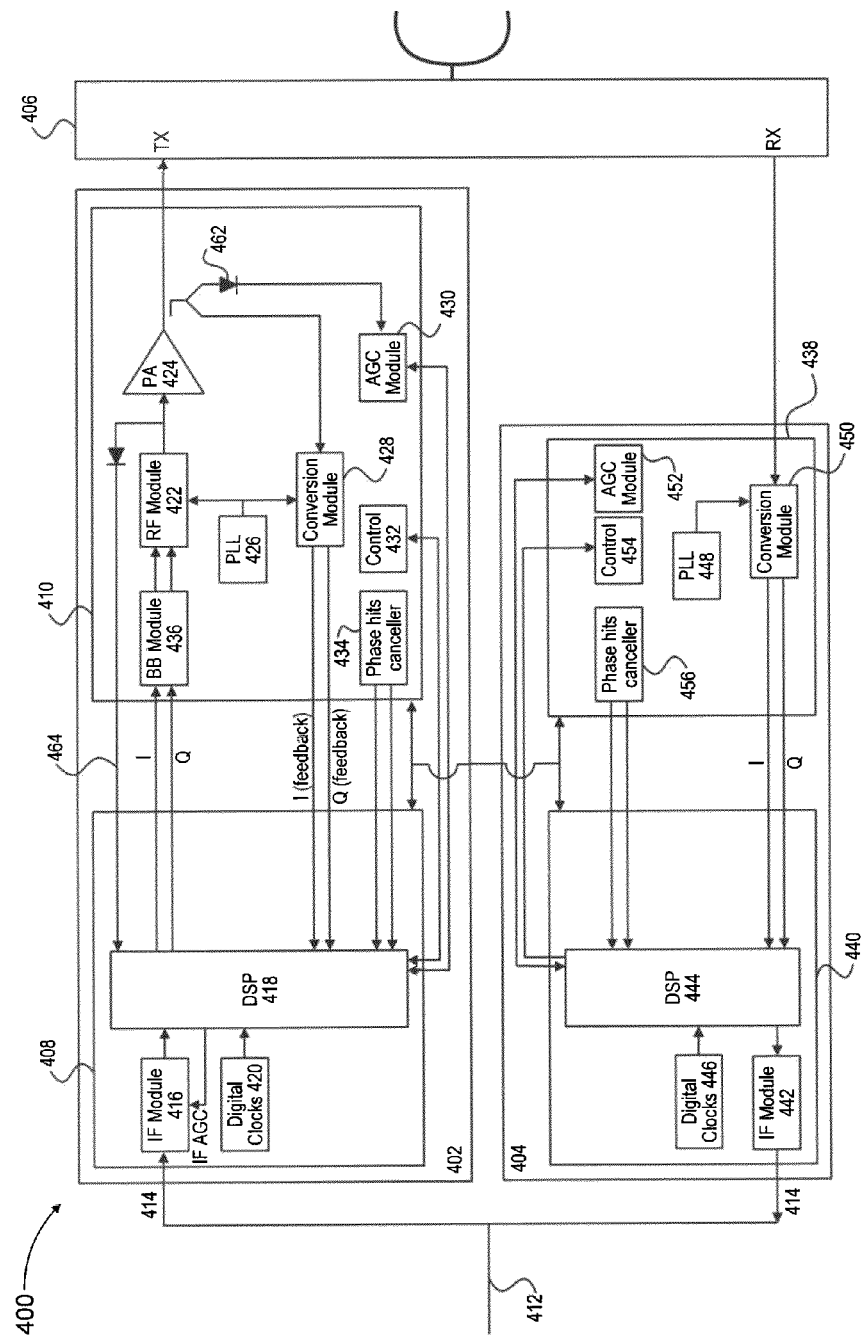
FIG. 4 illustrates a block diagram of a third outdoor communication unit (ODU) for implementation within a microwave backhaul system according to an exemplary embodiment of the present invention.

FIG. 4 illustrates a block diagram of a third outdoor communication unit (ODU) 400 according to an exemplary embodiment of the present invention. ODU 400 can represent an exemplary embodiment of ODU 300. ODU 400 can also represent a "smart ODU." ODU 400 includes a transmission block 402, a reception block 404 and a duplexer 406. ODU 400 can further have an N-Plexer (not shown), which can represent an exemplary embodiment of N-Plexer 324.

Transmission block 402 is configured to receive data 414 over a communication pathway 412, and to transmit data 414 to duplexer 406. Similarly, reception block 404 is configured to receive a signal from duplexer 406 and to transmit data 414 over communication pathway 412. Communication pathway 412 and data 414 can represent exemplary embodiments of communication pathway 112 and data 114, respectively.

Transmission block 402 can include a first transmission sub-section 408 and a second transmission sub-section 410. First transmission sub-section 408 includes an IF module 416, a digital signal processor (DSP) 418, and multiple digital clocks 420. In some embodiments, IF module 416 can perform substantially similar to IF module 220. Additionally, IF module 416 is configured to receive an IF automatic gain control (IF AGC) signal from DSP 418. In some embodiments, IF module 416 can be digitally implemented with a WBAFE module (wide band capture ADC/DAC). DSP 418 may represent an exemplary embodiment of DSP 248 of FIG. 2B. DSP 418 includes an analog font-end (AFE), and is configured to receive inputs from IF module 416 and digital clocks 420, as well as multiple feedback loops from various elements within second transmission sub-section 410. DSP 418 can also be configured to implement various algorithms and to perform post installation software updates. In an embodiment, DSP 418 can be configured to perform robust RF online calibration, which can utilize data 414 and communication pathway 412 to improve an overall performance of ODU 400.

Second transmission sub-section 410 includes a baseband (BB) module 436, an RF module 422, a power amplifier (PA) 424, an envelope detector 462, a phase locked loop (PLL) 426, a conversion module 428, an AGC module 430, a control block 432 and a phase hits canceller 434. RF module 422 can represent an exemplary embodiment of RF module 234, and PA 424 can represent an exemplary embodiment of power amplifier 330. In an embodiment, second transmission sub-section 410 can functional substantially as a digital repeater to perform various digital processing techniques.

BB module 436 is configured to receive In-phase (I) and Quadrature (Q) signals from DSP 418. BB module 436 is also configured to perform a frequency conversion of the I and Q signals from a BB frequency to IF. RF module 422 is configured to receive the converted I and Q signals from BB module 436 and to combine the signals into a single signal. RF module 422 can also be configured to transmit and/or receive a signal from PLL 426 and/or conversion module 428. RF module 422 is also configured to convert the combined signal from IF to RF. RF module 422 is further configured to send the combined signal back to DSP 418.

PA 424 is configured to receive the combined signal from RF module 422 and to amplify the signal's power. PA 424 is also configured to transmit the combined signal (TX) to duplexer 406.

Envelope detector 462 is configured to receive a high-frequency input from PA 424 and provide an output that represents the envelope of the original input. In an embodiment, envelope detector 462 may represent an exemplary embodiment of envelope detector 316 of FIG. 3.

AGC module 430 is configured to receive a signal from envelope detector 462, and to perform an automatic gain control operation on the signal. AGC module 430 is also configured to transmit and/or receive a signal between itself and DSP 418. Conversion module 428 is configured to receive a signal from PA 424 and to transmit and/or receive a combined signal from PLL 426 and/or RF module 422. Conversion module 428 can then perform a frequency conversion on at least one of the signal received from PA 424 and the combined signal received from PLL 426 and/or RF module 422. In particular, conversion module 428 can be configured to convert a signal from RF to BB. Conversion module 428 then outputs an I (feedback) signal and a Q (feedback) signal to DSP 418.

PLL 426 can be configured to transmit and/or receive a signal from RF module 422 and/or conversion module 428. In some embodiments, PLL 426 can be implemented as an electronic circuit, consisting of a variable frequency oscillator and a phase detector. This electronic circuit can be configured to compare a phase of an input signal with a phase of a signal derived from its output oscillator and adjust a frequency of its oscillator to keep these phases matched. A signal from the phase detector can also be used to control the oscillator via a feedback loop.

Control block 432 is configured to transmit and/or receive control and telemetry signals between itself and DSP 418. Phase hits canceller 434 is configured to sample signals (e.g. sampling PLL 426 for both a transmission and a reception), look for frequency jumps, and record any such frequency jumps in the digital domain. Phase hits canceller 434 is configured to correct phase hits and microphonics hits, which can be caused by physical phenomenon interacting with ODU 400 such as wind, rain, hail, or the like.

Reception block 404 can include a first reception sub-section 438 and a second reception sub-section 440. Second reception sub-section 440 includes an IF module 442, a DSP 444, and multiple digital clocks 446. IF module 442 can function substantially similar to IF module 416, and is configured to receive a signal from DSP 444. IF module is also configured to perform a frequency conversion of the signal received from DSP 444 such that IF module 442 can output data 414 to a corresponding IDU, via communication pathway 412. DSP 444 can function substantially similar to DSP 418, and is configured to receive inputs from digital clocks 446, as well as multiple feedback loops from various elements within first reception sub-section 438.

First reception sub-section 438 includes a phase locked loop (PLL) 448, a conversion module 450, an AGC module 452, a control block 454 and a phase hits canceller 456.

PLL 448 can function substantially similar to PLL 426. Conversion module 450 can function substantially similar to conversion module 428, and can be configured to receive a signal from PLL 448 and a signal (RX) from duplexer 406. Conversion module 450 can also be configured to transmit I and Q signals to DSP 444. AGC module 452 can function substantially similar to AGC module 430, and is configured to transmit and/or receive a signal between itself and DSP 444. Control block 454 can function substantially similar to control block 432, and is configured to receive a signal from DSP 444. Phase hits canceller 456 can function substantially similar to phase hits canceller 434.

First transmission sub-section 408 and second transmission sub-section 410, as well as first reception sub-section 438 and a second reception sub-section 440, can be communicably coupled together.

ODU 400 can be implemented to provide frequency coverage in the range of approximately 5.92 GHz to approximately 43.5 GHz. ODU 400 can also be configured to support both split mount architectures and all ODU architectures. Additionally, or alternatively, ODU 400 can implemented to cover substantially all radio bands.

In an embodiment, first transmission sub-section 408, second reception sub-section 440, second transmission sub-section 410 and first reception sub-section 438 may each be implemented on a single digital chip substrate. Additionally, or alternatively, first transmission sub-section 408 and second reception sub-section 440 may each represent a CMOS transistor, while second transmission sub-section 410 and first reception sub-section 438 may each represent a silicon-germanium (SiGe) transistor. Thus, ODU 400 may be configured having these exemplary CMOS transistors and SiGe transistors implemented on a signal digital chip substrate.

As discussed above, by implementing transmission block 402 and reception block 404 on a single digital chip substrate, ODU 400 has substantial digital capabilities, thus allowing ODU 400 to perform multiple digital processing techniques. In particular, transmission block 402 and reception block 404 can be configured to perform the digital processing techniques by sampling data 414, processing data 414 (allowing for at least some noise to be removed from data 414) and subsequently correcting a substantial amount of any error introduced in data 414. For example, these errors can represent frequency errors (e.g. phase hits), which can result from a physical disturbance of ODU 400, such as rain, hail, wind, or the like.

In some embodiments, these digital processing techniques are carried out by a combination of DSP 418, RF module 422, control block 432 and phase hits canceller 434, as well as the various feedback loops between these elements. In particular, phase hits canceller 434 can be configured to correct errors in data 414 by injecting correction metrics into data 414. Additionally, any one, or combination of, RF module 422, DSP 418 and/or control block 432 can produce these correction metrics by performing adaptive digital pre-distortion, closed-loop distortion and/or phase shifting, to provide some examples. Adaptive digital pre-distortion allows for ODU 400 to dynamically compensate for power amplifier distortions. For example, because PA 424 can be formed of SiGe, it can have relatively low performance characteristics compared to convention off-chip PAs. Therefore, by performing adaptive digital pre-distortion, envelope detector 462 and AGC module 430 can compensate for PA 424's reduced performance. Adaptive digital pre-distortion also improves the performance of ODU 400 in terms of process aging and voltage/temperature changes. Further, adaptive digital pre-distortion can increase ODU 400's transmission power by approximately 2 dB to approximately 3 dB. Therefore, these adaptive digital pre-distortion capabilities can provide for a more efficient power consumption by ODU 400.

Additionally, transmission block 402 and reception block 404 can be configured to perform other algorithmic functions to substantially reduce errors that may be caused by other issues such LO leakage, other image problems, or the like. For example, any one, or combination of, RF module 422, DSP 418, phase hits canceller 434 and/or control block 432 can include a digital LO leakage cancelation feature and an image reduction feature. Transmission block 402 and reception block 404 can be configured to perform these algorithmic functions over a substantially wide channel separation within dual channel communication pathway 412. Further, the digital capabilities of transmission block 402 and reception block 404 allow interferers to be removed up to the order of approximately 80 dBc.

ODU 400 can also be configured to fix errors (e.g. noise) associated with a corresponding IDU and/or communication pathway 412. For example, in an embodiment an IDU can have non-linearities associated therewith. Any one, or combination of, RF module 422, DSP 418, phase hits canceller 434 and/or control block 432 can be configured to eliminate these non-linearities by performing a post-distortion process, or the like. For example, any one, or combination of, RF module 422, DSP 418, phase hits canceller 434 and/or control block 432 can apply a polynomial (e.g. a correction metric) to data. 414 to correct any non-linearities caused by a corresponding IDU. Therefore, a cleaner version of data 414 can be transmitted and/or received over communication pathway 412.

Errors that can exist within data 414 can represent RF errors (e.g. IQ mismatch, frequency dependent mismatch, phase hits, microphonics hits, noise and calibration issues). RE errors can be particularly problematic When working with high quality signals, because to properly transmit and/or receive high quality signals. ODU 400 should include high performance RE components. Therefore, to correct these RF errors, each of the components included within transmission block 402 and reception block 404 are implemented in the digital domain, rather than in the analog domain. For example, AGC modules 430 and 452 are configured to have a second order loop (where only a first order loop can be possible with AGC modules implemented in the analog domain), which can correct fading issues associated with communication pathway 412. Additionally, by implementing AGC modules 430 and 452 in the digital domain, their bandwidths can be kept constant.

ODU 400's digital capabilities also eliminate the need to implement some conventional functionality within ODU 400. For example, certain types of filters that were previously needed for dual up-conversion and for superheterodyning can be eliminated. Additionally, at least a portion of the N-Plexer can also be eliminated due to the digital filtering, and other digital processing, being performed by ODU 400.

In an embodiment, ODU 400 (or IDU 202) can be integrated with any one, or combination of, a powerline, Wi-Fi, LTE, WiMax, Bluetooth, radio(s), or the like. ODU 400 (or IDU 202) can also be integrated with other network functionality such as routers, bridges, and/or switches, to provide some examples. ODU 400 (or IDU 202) can be configured to perform a merger of different communication types (e.g. backhaul communication or LAN/point-to-point communication). Additionally, ODU 400 (or IDU 202) can be configured to prioritize each of the different communication types based on various different factors. ODU 400 (or IDU 202) can also be configured analyze each of the different communication types to provide quality of service (QoS) treatment.

An Exemplary Dual Channel Microwave Backhaul System

Figure 5:
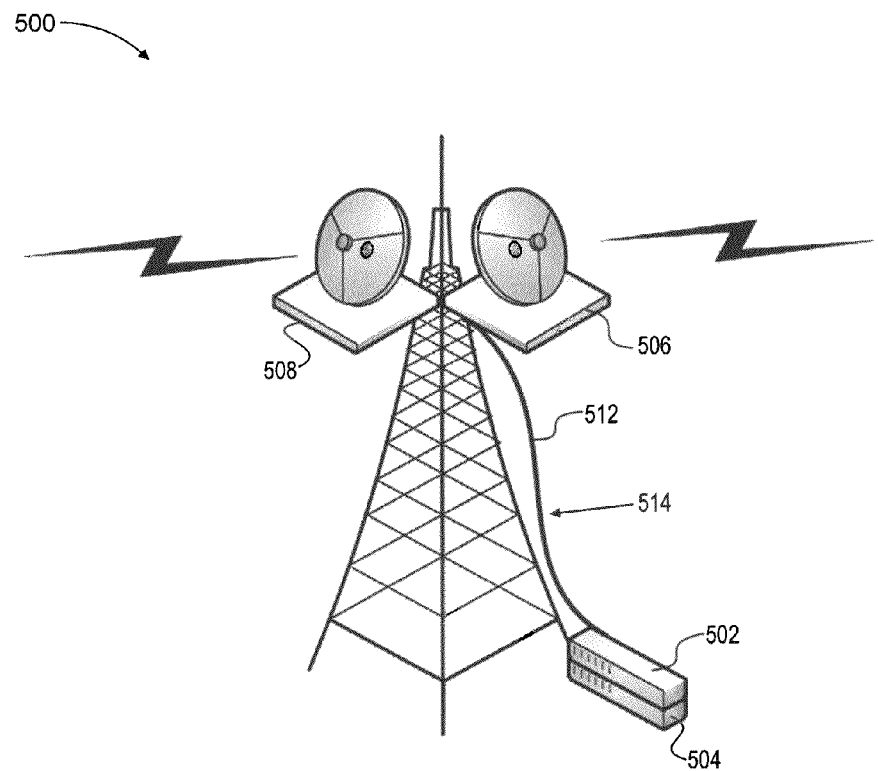
FIG. 5 illustrates a block diagram of second microwave backhaul system having a dual channel configuration according to an exemplary embodiment of the present invention.

FIG. 5 illustrates a block diagram of a second microwave backhaul system 500 having a dual radio configuration, which includes two IDUs 502 and 504, and two ODUs 506 and 508 according to an exemplary embodiment of the present invention. IDUs 502 and 504, and ODUs 506 and 508 are coupled together via a dual channel communication pathway 512. IDUs 502 and 504 can each represent an exemplary embodiment of IDU 202 of FIG. 2A, and ODUs 506 and 508 can each represent an exemplary embodiment of ODU 204 of FIG. 2B, ODU 300 of FIG. 3 and/or ODU 400 of FIG. 4.

Dual channel communication pathway 512 can be implemented within any of the microwave backhaul systems described above (e.g. microwave backhaul system 100 and microwave backhaul system 200). Although microwave backhaul systems 100 and 200 are described as being split microwave backhaul systems, dual channel communication pathway 512 can also be implemented within other types of mobile backhaul networks. For example, dual channel communication pathway 512 can be utilized to provide communication within conventional split ODU configurations, all ODU configurations, or the split microwave backhaul architectures disclosed herein.

In embodiments where dual channel communication pathway 512 is implemented within an all ODU configuration, a single modem can be used to drive the two channels through a single digital-to-analog converter (DAC)/analog-to-digital converter (ADC), a single transmitter, and a single receiver. In embodiments where dual channel communication pathway 512 is implemented within split microwave backhaul architectures, the ODU is configured to transmit/receive two channels from various configurations and to flexibly configure the channels such that they can traverse through an air interface.

Dual channel communication pathway 512 can include two adjacent channels, two non-adjacent channels, or a dual channel over a single cable, to provide some examples. In some embodiments, dual channel communication pathway 512 can comprise two non-adjacent channels that are flexibly configured to support numerous different backhaul configurations over a wide range of operating parameters. Implementing communication pathway 512 having two channels, rather than only a single channel, will effectively double the capacity of microwave backhaul system 500, which can be significantly important as the demand for higher capacity mobile backhaul networks continues to grow.

However, transmitting two non-adjacent channels through a single RF lineup in a conventional manner can create difficulties from a linearity perspective. In particular, the cross modulation products from the two channels can prevent the associated microwave backhaul system from being able to meet the European Telecommunications Standards Institute (ETSI) standards.

Dual channel communication pathway 512 is configured to overcome the deficiencies associated with conventional dual channel communications and to meet ETSI standards by implementing an adaptive digital predistortion mechanism through one or more RF feedback paths (see I (feedback), Q (feedback) and RF feedback 464 shown in FIG. 4). In particular, by performing this adaptive digital predistortion technique, intermodulation distortion (IMD) products can be significantly reduced to meet the required ETSI standards and to allow for the transmission of high power signals. Additionally, dual channel communication pathway 512 is capable of being used in conjunction with several different ODU configurations, and several different power amplifiers that can be included therein.

As discussed above, dual channel communication pathway 512 can be implemented having two non-adjacent channels that are each transmitted through a single DAC/ADC. However, using conventional means to transmit two channels through a single DAC/ADC can create problems such as LO leakage and/or various image problems, which can prevent the associated microwave backhaul system from meeting ETSI standards. Additionally, these problems could result in errors (e.g. noise) being introduced into data 514. To overcome these conventional issues, ODUs 506 and 508 include substantial digital capabilities, and thus also have improved RF functionalities. In some embodiments, the ODUs' digital capabilities allows them to perform multiple digital processing techniques. In particular, errors that can be present in data 514 can be substantially eliminated using the ODUs' digital capabilities, which can include sampling data 514, filtering data 514 and processing data 514 (allowing for at least some noise to be removed from data 514). Additionally, ODUs 506 and 508 can be configured to perform other algorithmic functions to substantially, reduce any LO leakage and/or other image problems. For example, the ODUs' digital capabilities can further include a digital LO leakage cancelation feature and an image reduction feature. ODUs 506 and 508 can be configured to perform these algorithmic functions over a substantially wide channel separation within dual channel communication pathway 512. Further, the digital capabilities of ODUs 506 and 508 allow interferers to be removed up to the order of approximately 80 dBc.

In some embodiments, dual channel communication pathway 512 can allow single chip cross polarization interference cancellation (XPIC) to be performed to increase a transmission capacity between ODUs 506 and 508, and IDUs 502 and 504. Dual channel communication pathway 512 can also have a link capacity of approximately 112 MHz, and can be configured to support approximately 2048 QAM. Additionally, or alternatively, dual channel communication pathway 512 can be configured to enable non-adjacent channel capacity aggregation, which can facilitate a relatively easy deployment of dual channel communication pathway 512 as well as ODUs 506 and 508. Dual channel communication pathway 512 can be further configured to provide radio-link bonding to support an efficient link protection.

In embodiments, dual channel communication pathway 512 can support other double capacity configurations such as multiple-input and multiple-output (MIMO) spatial multiplexing and radio optimized network planning, to provide some examples.

Figure 6:
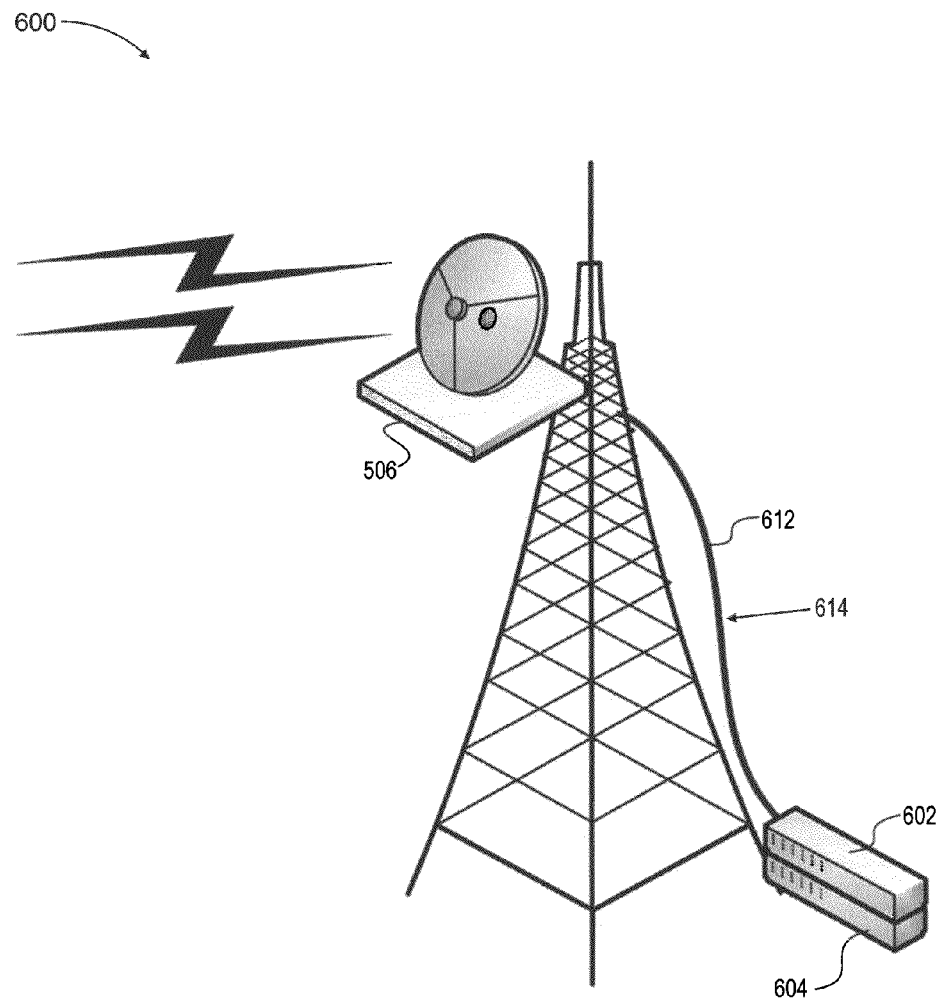
FIG. 6 illustrates a block diagram of a third microwave backhaul system having a dual channel configuration according to an exemplary embodiment of the present invention.

FIG. 6 illustrates a block diagram of a third microwave backhaul system 600 that includes two IDUs 602 and 604, and an ODU 606 according to an exemplary embodiment of the present invention. IDUs 602 and 604, and ODU 606 are coupled together via a dual channel communication pathway 612. IDUs 602 and 604 can each represent an exemplary embodiment of IDU 202 of FIG. 2A, and ODU 606 can represent an exemplary embodiment of ODU 204 of FIG. 2B, ODU 300 of FIG. 3 and/or ODU 400 of FIG. 4.

Microwave backhaul system 600 represents a dual channel configuration that supports a full cross polarization interference cancellation (XPIC) configuration. The full XPIC configuration can allow microwave backhaul system 600 to have approximately double the capacity of a single channel configuration. In particular, dual channel communication pathway 612 is configured to have two parallel communication channels over the same interconnect, each channel having orthogonal polarizations. Additionally, dual channel communication pathway 612 can be implemented using channel bonding, which can enable non-adjacent channel capacity aggregation.

In an embodiment, two transmission and two receipt channels of approximately 112 MHz can be placed on dual channel communication pathway 612, which can represent a single IF cable. ODU 606 also includes substantial digital capabilities, which allows it to filter out and separate the two transmission channels and the two receipt channels. In particular, ODU 606 can be configured to receive the two transmission and two receipt channels over dual channel communication pathway 612. ODU 606 can then use its digital capabilities to sample and filter each of the channels, process each of the channels (allowing for at least some noise to be removed from the channels) and subsequently correct a substantial amount of any error introduced in the channels. Following this processing, ODU 606 can then separate each of the channels in the digital domain. Therefore, the digital capabilities included in ODU 606 can allow for several channels to be included within dual channel communication pathway 512 (e.g. a single IF cable).

As discussed above, a significant portion of the installation costs associated with microwave backhaul networks spans from the interconnect used to provide communication between the IDU and the ODU, which in some embodiments can be separated by a distance up to approximately 300 meters. Therefore, implementing dual channel communication pathway 512 (or 612) can effectively double the capacity of microwave backhaul system 500 (or 600) while using only about half the amount of cable, or the like, which could significantly reduce installation costs. In particular, typically a microwave backhaul network having the configurations shown in FIGS. 5 and 6 would require two IF cables to provide communication between the IDUs and the ODUs; however, implementing digital capabilities within ODUs 506, 508 and 606 in conjunction with dual channel communication pathway 512 and 612 eliminates the need for two separate IF cables.

Figure 7:
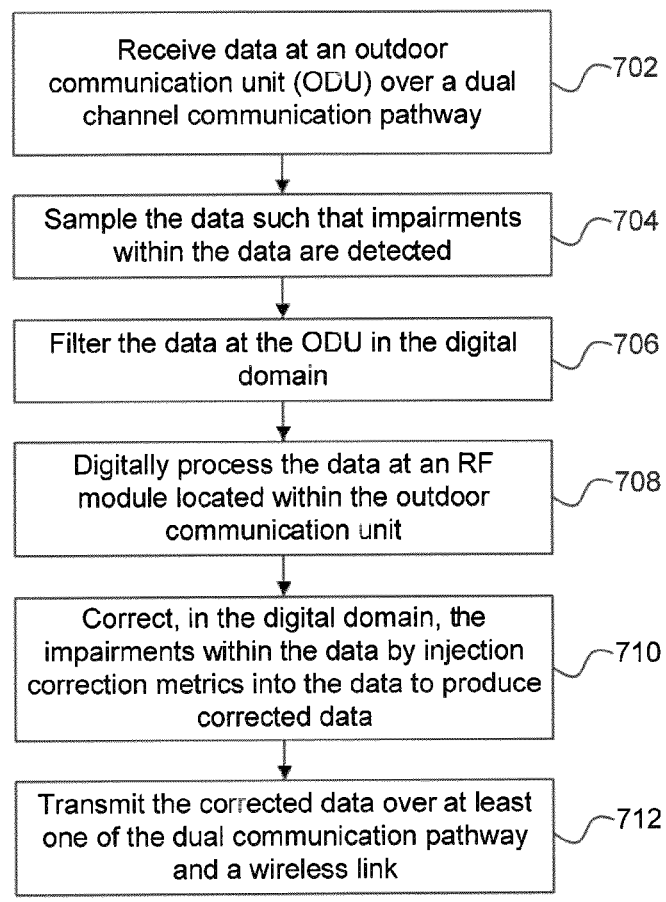
FIG. 7 is a flowchart of exemplary operational steps of correcting errors within a dual channel microwave backhaul system according to an exemplary embodiment of the present invention.

An Exemplary Method of Correcting Errors within a Dual Channel Microwave Backhaul System FIG. 7 is a flowchart of exemplary method for correcting errors within a microwave backhaul system according to an exemplary embodiment of the present invention. The flowchart of FIG. 7 is described with reference to embodiments of FIGS. 1-6. However, a method 700 is not limited to these embodiments.

Method 700 begins at step 702 where data, such as data 614 to provide an example, is received at an ODU, such as ODU 606 to provide an example, over a dual channel communication pathway, such as the dual channel communication pathway 612 to provide an example. The dual channel communication pathway can represent two adjacent channels, two non-adjacent channels or a dual channel over a single cable, to provide some examples. The data can be received at ODU 606 from IDUs, such as IDUs 602 and 604 to provide some examples, or the data can be received directly from the core network (e.g. an all ODU configuration).

In step 704, the data is sampled within the ODU. In particular, during sampling of the data, any errors that can exists within the data are detected. In some embodiments, these errors can include phase hits and/or microphonics hits, which can be caused by physical phenomenon coming into contact with the ODU (e.g. wind, hail, rain, or the like). Errors within the data can also materialize as IQ mismatch, frequency dependent mismatch and calibration issues. These errors can also be associated with the IDUs and/or the dual channel communication pathway. For example, the IDUs and/or the dual channel communication pathway can have non-linearities which could impair the data during transmission between the IDUs and the ODU. In some embodiments, errors within the data can result for its transmission over a wireless link.

In step 706, the data is filtered within the ODU such that the data can be transmitted and/or received over the dual channel communication pathway. For example, filters, such as the filters 310 and 311 to provide an example, can be configured to perform any combination of an analog filtering process, a signal sampling process and a digital filtering process.

In step 708, the ODU digitally processes the data. For example, the ODU can perform adaptive digital pre-distortion, LO leakage cancelation, image reduction, spatial multiplexing, cross polarization interference cancellation (XPIC), closed-loop distortion, post-distortion, and/or phase shifting. This digital processing can allow for the ODU to dynamically compensate for distortions within a microwave backhaul system. Additionally, this digital processing can also improve the performance of the ODU in terms of process aging and voltage/temperature changes, and can provide for a more efficient power consumption by the ODU.

In step 710, the ODU corrects the detected errors within the data. In particular, the ODU injects correction metrics into the data to produce corrected data. These correction metrics can be produced using the digital processing techniques carried out in step 708 (e.g. adaptive digital pre-distortion, LO leakage cancelation, image reduction, spatial multiplexing, cross polarization interference cancellation (XPIC), closed-loop distortion, post-distortion, and/or phase shifting). Additionally, or alternatively, the ODU can correct the detected errors by applying a polynomial to the data to correct any non-linearities caused by the IDUs or by the dual channel communication pathway. In some embodiments, the ODU can also be configured to correct errors within the data that can result for its transmission over the wireless link.

In step 712, the corrected data is output from the ODU. In particular, by correcting the errors within the data, the ODU can be configured to properly transmit the data over the dual channel communication pathway to the corresponding IDUs. Additionally, or alternatively, by correcting errors within the data, the ODU can be configured to properly transmit the data over a wireless link via an antenna.

Conclusion

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A microwave backhaul system, comprising:
   an indoor communication unit, having a modem assembly and a first N-Plexer, configured to perform modulation or demodulation of data, and to perform a conversion of the data;
   an outdoor communication unit, having a second N-Plexer and an RF module with digital capabilities, wherein the RF module comprises a canceller configured to correct errors in the data by sampling the data, detecting frequency jumps, and recording the frequency jumps in a digital domain, wherein the RF module is configured to digitally filter the data, and wherein the RF module further comprises a digital signal processor configured to implement one or more algorithms;
   a processor unit, coupled to the second N-Plexer, configured to carry out instructions to control operation of the second N-Plexer, and one or more converter modules, coupled to the second N-Plexer the one or more converter modules being configured to convert the data between the digital domain and an analog domain; and
   a dual channel communication pathway, communicably coupled between the indoor communication unit and the outdoor communication unit, configured to communicate the data between the indoor and outdoor communication units over two communication channels.

2. The microwave backhaul system of claim 1, wherein the RF module is coupled to one of the converter modules and is configured to convert the data from a baseband to a radio frequency and to perform automatic gain control in the digital domain.

3. The microwave backhaul system of claim 1, wherein the dual channel communication pathway is a single cable.

4. The microwave backhaul system of claim 1, wherein the two communication channels are two non-adjacent channels.

5. The microwave backhaul system of claim 1, wherein the dual channel communication pathway includes two transmission channels and two receipt channels, each having a bandwidth of 112 MHz.

6. The microwave backhaul system of claim 1, wherein the outdoor communication unit is configured to remove interferers up to an order of approximately 80 dBc.

7. The microwave backhaul system of claim 2, wherein the RF module is implemented on a digital chip substrate.

8. The microwave backhaul system of claim 1, wherein the canceller is further configured to make adaptive adjustments in response to phase hits and microphonics hits.

9. The microwave backhaul system of claim 1, wherein the digital capabilities comprise at least one of: an adaptive digital pre-distortion process, LO leakage cancelation, image reduction, spatial multiplexing, cross polarization interference cancellation (XPIC), a closed-loop distortion process, a phase shifting process and a post-distortion process.

10. A microwave backhaul system, comprising:
    a dual channel communication pathway configured to communicate data over two communication channels; and
    an outdoor communication unit, having a modem assembly, an N-Plexer and an RF module with digital capabilities, configured to transmit and receive the data over the dual channel communication pathway, wherein the outdoor communication unit further comprises a processor unit, coupled to the N-Plexer, configured to carry out instructions to control operation of the N-Plexer and one or more converter modules, coupled to the second N-Plexer, wherein the one or more converter modules are configured to convert the data between a digital domain and an analog domain, wherein the RF module comprises a canceller configured to correct errors in the data by sampling the data, detecting frequency jumps, and recording the frequency jumps in the digital domain, and wherein the RF module is configured to digitally filter the data, and wherein the RF module further comprises a digital signal processor configured to implement one or more algorithms.

11. The microwave backhaul system of claim 10, wherein the modem assembly is configured to drive the two communication channels through a converter module, a transmitter module, and a receiver module.

12. The microwave backhaul system of claim 10, wherein the outdoor communication unit further comprises: a digital repeater configured to facilitate transmission of the data over the dual channel communication pathway.

13. The microwave backhaul system of claim 10, wherein the digital capabilities comprise at least one of an adaptive digital pre-distortion process, LO leakage cancelation, image reduction, spatial multiplexing, cross polarization interference cancellation (XPIC), a closed-loop distortion process, a phase shifting process and a post-distortion process.

14. The microwave backhaul system of claim 10, wherein the RF module is further configured to provide frequency coverage in a range of approximately 5.92 GHz to approximately 43.5 GHz.

15. The microwave backhaul system of claim 10, wherein the dual channel communication pathway includes at least one of a single IF cable, two adjacent channels and two non-adjacent channels.

16. The microwave backhaul system of claim 10, wherein the RF module is implemented on a digital chip substrate.

17. A method of correcting errors within a dual channel microwave backhaul system, comprising:
receiving data at an outdoor communication unit over a dual channel communication pathway having a first communication channel and a second communication channel;
converting the data from an analog domain to a digital domain;
sampling the data such that errors within the data are detected;
detecting frequency jumps within the data;
recording the frequency jumps in a digital domain;
filtering the data within the outdoor communication unit in the digital domain;
digitally processing the data at an RF module located within the outdoor communication unit, using one or more algorithms;
correcting, in the digital domain, the errors within the data by injecting correction metrics into the data to produce corrected data; and
transmitting the corrected data over at least one of a dual channel communication pathway and a wireless link.

18. The method of claim 17, further comprising separating the data received over the first and second communication channels into transmission channels and receipt channels in the digital domain.

19. The method of claim 18, wherein the correcting is performed using at least one of an adaptive digital pre-distortion process, LO leakage cancelation, image reduction, spatial multiplexing, cross polarization interference cancellation (XPIC), a closed-loop distortion process, a phase shifting process and a post-distortion process.

* * * * *